Patented Oct. 23, 1945

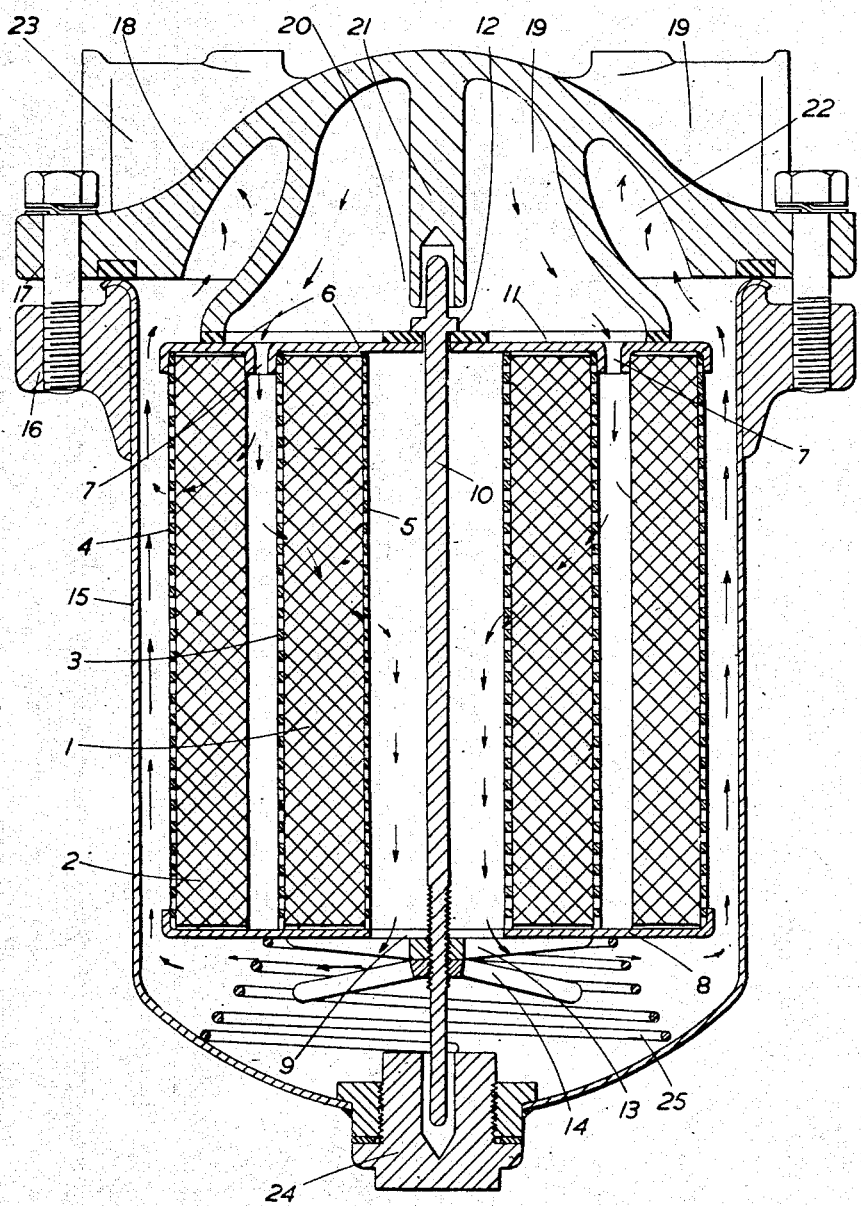

2,387,368

UNITED STATES PATENT OFFICE 2,387,368

FILTER FOR LIQUIDS OR GASES

Cecil Gordon Vokes, London, England

Application February 25, 1943, Serial No. 477,127
In Great Britain February 26, 1942

2 Claims. (Cl. 210—184)

A filter which is extensively used includes a unit (often in the form of a filter element shaped as a star or other closed figure carried between end caps) so arranged that the fluid passes through the element. When such a filter is used (as when filtering internal combustion engine or compressor intakes) for filtering a surrounding medium, the flow is commonly from outside to inside the unit. When the unit is mounted in an outer casing, the flow can be either way; but in cases where it is desired to by pass the unit in case excessive back pressure developes, the unit can be resiliently held against a joint from which it can be arranged to move away bodily when a certain back pressure is reached. It is desirable in such cases to filter from inside to outside both to facilitate this action and so that dirt or sludge already removed will be retained inside the by passed unit.

The space available for filters is often very limited and to obtain additional element area in a given space may enable a finer element to be used under prevailing conditions. The main idea underlying the present invention is the incorporation in a single unit of two or more elements one inside another and arranged for parallel flow.

While various other arrangements are possible, the invention will be illustrated in its preferred form in which a space between two such elements may be regarded as the inside of the unit, the space inside the inner of such elements and that outside the outer of such elements being regarded as external space. There will thus normally be an inlet into the roughly speaking annular space between two elements and the central space will discharge into the space surrounding the unit.

The parts of the invention for which a monopoly is desired are those set out in the claims.

Referring now to the accompanying drawing, which is a vertical sectional view, the filter unit incoporates two concentric elements, an inner element 1 and an outer element 2. These may be of any appropriate material, but are preferably of the well-known pleated or star-shaped form, enclosed in cylindrical foraminated shells 3 and 4, shown as of perforated metal. An inner shell 5 is also used to prevent deformation inward of the inner element. The upper end cap 6 is formed to locate and secure the upper ends of the elements and has apertures 7 leading into the space between the two elements. The lower end cap 8 similarly locates and secures the lower ends of the elements and has a central outlet aperture 9. The assembly of the unit is completed by a central rod 10 with a joint ring 11 and nut 12 at the top and a retaining spider 13 and wing nut 14 at the bottom.

The outer casing 15 is secured by a clamp ring 16 and screws 17 to a header 18. The header is formed with an inlet connection 19 leading to the annular inlet 20 surrounding a central guide 21 within a recess in which the upper end of the assembly rod 10 is guided. The outer passage 22 leads to an outlet connection 23. Screwed into the bottom end of the casing is a drain plug 24, with a recess in which the lower extension of the assembly rod 10 is guided. A spring 25 between the bottom of the casing and the bottom of the unit applies resilient pressure.

In case the back pressure exceeds a certain value the unit moves away from the head of the casing and by breaking a joint between inlet and outlet bypasses the unit.

This particular form has the advantage that the spring loading has to be fairly considerable relatively to the designed back pressure as compared with the normal unit with a simple central inlet, thus helping to obtain a good seal at the by pass joint as well as between the end caps and the elements.

I claim:

1. A filter having a casing, inlet and outlet passages therein, a filtering unit including an upper cap, a lower cap, spaced inner and outer filtering elements held by and between the caps to define a filter-inlet area between the elements and filter outlet areas beyond the inlet area relative to each filtering element, means for yieldingly holding the filtering unit to normally position the upper cap to cut off direct communication between the inlet and outlet passages, said upper cap being formed to establish flow communication between the inlet passage and filter inlet area and between the filter outlet area and the outlet passage when such unit is in normal position, the filtering unit yielding bodily under fluid pressure through the inlet passage and as a result of filtering element fluid block, to move the upper cap to a position to establish open by-pass communication between the inlet and outlet passages.

2. A construction as defined in claim 1, wherein the means for yieldingly supporting the unit includes a spring within the casing and providing a yielding support for the full filtering unit to be operatively influenced under predetermined filtering block of both filtering elements and tensioned against yielding under any filtering block of but one filtering element alone.

CECIL GORDON VOKES.